No. 636,759. Patented Nov. 14, 1899.
J. CHASE.
APPARATUS FOR DISINTEGRATING ANIMAL MATTER.
(Application filed Jan. 17, 1898.)
(No Model.)
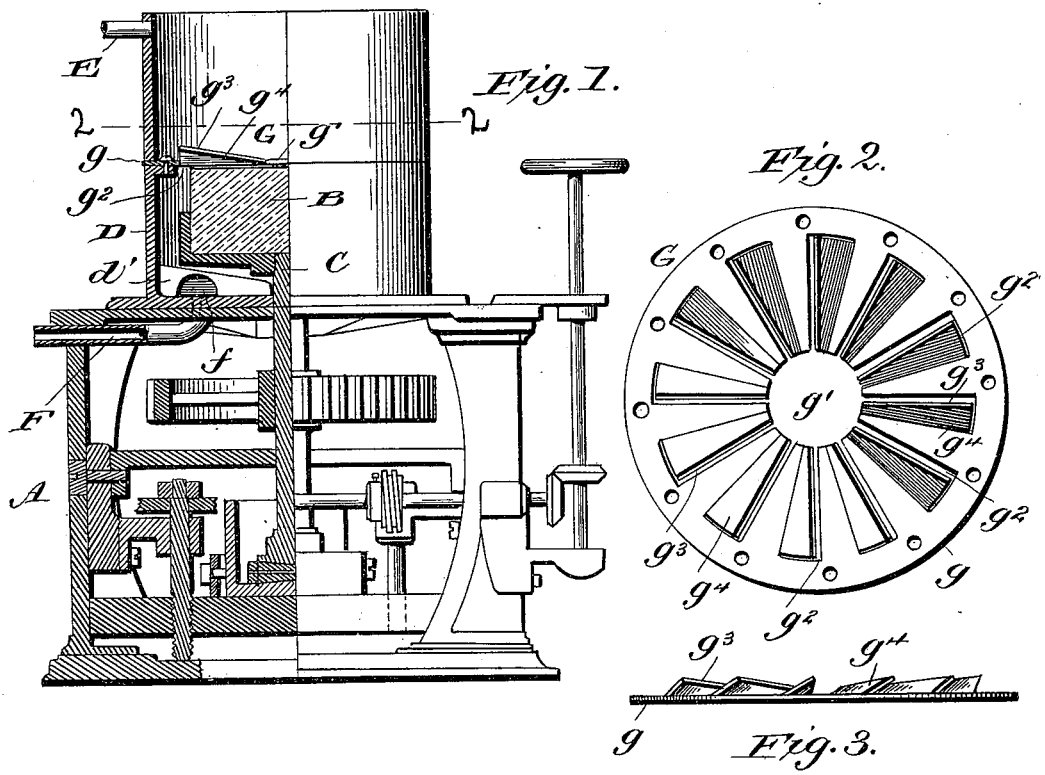
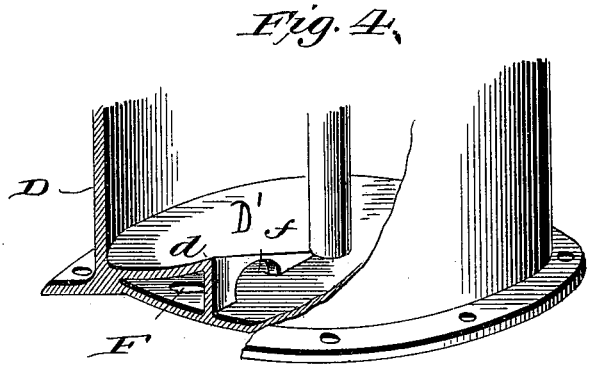
Witnesses:
L. C. Hills.
Ewellasick
Inventor:
Jefferson Chase,
By Marcellus Bailey
Atty.

UNITED STATES PATENT OFFICE.

JEFFERSON CHASE, OF PORTLAND, MAINE, ASSIGNOR TO THE CHASE MANUFACTURING COMPANY, OF SAME PLACE.

APPARATUS FOR DISINTEGRATING ANIMAL MATTER.

SPECIFICATION forming part of Letters Patent No. 636,759, dated November 14, 1899.

Application filed January 17, 1898. Serial No. 666,914. (No model.)

*To all whom it may concern:*

Be it known that I, JEFFERSON CHASE, a citizen of the United States, and a resident of the city of Portland, in the county of Cumberland and State of Maine, have invented certain new and useful Improvements in Apparatus for Disintegrating Animal Matter, of which the following is a specification.

My invention is directed to apparatus for disintegrating or separating the fibers of leather, rawhide, or other fibrous animal matter without appreciably cutting, grinding, or pulverizing said fibers, the purpose being to obtain a fibrous mass which while moistened and in a plastic state can be shaped into any desired form or article, the resulting product possessing most of the characteristics of leather made from natural hide, such as fibrous and cellular structure, elasticity, durability, resistance to abrasion, leather affinity, and other qualities which are peculiar to leather.

The fibrous structure of leather or animal skin is due to a plexus or network of muscles, blood vessels, nerves, and other animal fibers interwoven in an irregular manner for nature's functional purposes. When such substance is subjected to the abrading influences of a rapidly-moving friction-surface under conditions of a considerable pressure, and especially when in a dry condition, the effect is to grind, cut, or pulverize it and to destroy the desired fibrous condition of the resulting particles; but if such substance can be subjected to the action of the moving abrading-surface without pressure or when under a very light and yielding pressure, and especially when it is moistened or in the presence of a liquid, the result will be a disintegration and separation of the fibers by a tearing action without the production of any substantial amount of granular or pulverized particles. It is the object of my invention to realize this result.

I will now proceed to describe, by reference to the accompanying drawings, the apparatus in which my invention is embodied and will then point out more particularly in the claims those features thereof I believe to be new and of my own invention.

In the drawings, Figure 1 is a sectional elevation of a disintegrating apparatus embodying my invention. Fig. 2 is a plan view taken on the line 2 2 of Fig. 1. Fig. 3 is a detail view, enlarged, illustrating the abrading-stone and the spider associated therewith. Fig. 4 is a perspective view illustrating the bottom and lower part of the casing surrounding the abrading-stone and the discharge-passage for the disintegrated material. Fig. 5 is an enlarged sectional detail.

In the drawings, A represents a curb in which is mounted the driving and adjusting mechanism of a horizontally-arranged disintegrating-stone B, mounted on a vertical shaft C. This driving and adjusting mechanism may be of any usual or preferred construction, and I have in the drawings illustrated mechanism like that shown in my Patent No. 233,071, of October 12, 1880, and hence need not herein describe it in detail. The stone B or other equivalent abrading substance which might be employed in its stead is mounted in the lower part of a feed cylinder, tube, or casing D, which is adapted to receive the pieces of leather or other suitable animal substance which are to be disintegrated into their component fibers, which casing is preferably made liquid-tight and provided with means, such as supply-pipe E, whereby a liquid may be supplied to keep the material moist or in suspension in a body of the liquid. The lower part of the cylinder or tube D—the part which surrounds the stone—is shaped to collect the material which has been disintegrated, and a pipe F, through which such material may pass, leads off therefrom. To facilitate the discharge of the material through this pipe, I prefer to construct the bottom D' of the tube or casing in the lower part of which the stone is mounted with an inclined part d, which slopes downward in the direction in which the stone runs and joins at its upper or most raised portion with the main part of the bottom by a step or vertically-disposed face d'. In this vertical face the opening f into the discharge-pipe F is situated.

The disintegrated fibers mixed with liquid form a semifluid mass which will readily flow, and this, collecting in the lower part of the casing D, surrounding the stone, will have a rotary or whirling movement imparted to it by the rapid rotation of the stone B. As the opening $f$ into the discharge-pipe F stands directly across or in the course of such movement of the suspended disintegrated material, there is a constant and easy discharge, and as the opening $f$ is in the bottom or lower part of the casing the fibers, which sink in the liquid, cannot collect or become lodged in the casing, but pass away rapidly and freely after being separated. The flow through the pipe F by reason of the construction just described is largely governed by the speed at which the apparatus is being worked. Above the stone there is arranged a perforated or slotted plate or spider G, the under face of which is flat and arranged close to the upper abrading-face of the stone. The preferred form of the spider is illustrated in Figs. 2 and 3, and consists of a plate of thin material, preferably metal, so shaped as to have an annular rim $g$, by means of which it is secured to the tube or casing surrounding the stone, and an intermediate radially-slotted portion $g'$. The central part of the plate from which the spider is formed is cut away for the passage of the shaft C when that is carried up above the spider. The main intermediate part $g'$ of the plate is cut with a number of ⌐-shaped slits $g^2$, and the edges of the radially-arranged segments $g^3$ thus formed are turned up and form wings $g^4$, under which are openings through the spider. The wings $g^4$ on their upper faces incline downward in the direction in which the stone B turns, and the upper edges of the wings are preferably at a distance apart greater than the longest dimension of any piece of leather or other substance which will be fed into the apparatus to be disintegrated in order that the material may not lodge upon two adjacent wings, bridging the opening through the plate between them, and so tending to that extent to clog the feed of the apparatus.

The apparatus is used and operates as follows: Scraps or small pieces of leather, rawhide, or other suitable animal substance are fed into the cylinder or tube D, together with a sufficient supply of water or other suitable liquid, such as oil, to keep the pieces in suspension, and the stone is set to revolving rapidly. The pieces of leather settle upon the spider, and their edges pass through the openings therein, and coming in contact with the stone or moving abrading-surface are gradually torn apart or disintegrated thereby, the fibers of which leather or hide are composed being separated from each other without being cut or ground up into minute particles. This action rather than a grinding action takes place because the material to be disintegrated is presented to the moving abrading-surface under very light pressure, and the action is assisted by reason of the presence of the water or other liquid, which softens the leather and renders its disintegration more easy. The spider prevents the material from being carried around with the stone and operates to cause the pieces of leather to be presented to the stone in a manner to cause their most rapid disintegration. The spider might be dispensed with and other contrivances employed to properly present the material to the abrading or disintegrating surface. While I prefer to use an abundant supply of liquid, such as water, in order to keep the pieces of leather in suspension, still the end in view would be attained, though in a less perfect manner, if the leather were merely moistened, or even if it were fed to the stone in a dry condition. The disintegrated fibers, mixed with water, are drawn off through the pipe F and collected in suitable receptacles, where the excess of water may be drawn off in any suitable way. The material after the water has been thus drawn off may be shaped into various articles by molding and pressure, or by being passed between calendering-rollers it may be made into sheets, from which various articles may be cut by dies, saws, or other tools.

For some purposes it is desirable to mix the animal fiber produced as described with wool, cotton, wood-pulp, or other suitable animal or vegetable fiber. Articles made from such mixed fibers possess many of the characteristics of the articles made entirely from the disintegrated animal fiber herein described and are less expensive.

By my process I am enabled to utilize small pieces and scraps of leather, which are now a waste and useless product of many lines of manufactures, and to make therefrom a valuable substance.

The product of my invention is homogeneous, hard, and tenacious and is especially suitable for pulleys, mallets, gears, buffing-wheels, &c.

Having described my invention, what I claim, and desire to secure by Letters Patent, is as follows:

1. The herein-described apparatus for disintegrating animal matter into its component fibers, comprising a single movable abrading-surface, and an opposing spider through which the material is fed to the abrading-surface consisting of a thin plate slotted between its edge and central portion, substantially as and for the purposes hereinbefore set forth.

2. The combination with a stone, and means for causing it to revolve, of a spider arranged opposite one face of the stone, and consisting of a plate having radial segments separated from each other by slits, the edges of the segments which face the direction of the movement of the stone being turned up, substantially as and for the purposes hereinbefore set forth.

3. In a machine for disintegrating animal matter, into its component fibers, the combination of a movable abrading-surface, an opposing spider through which the material is fed to the abrading-surface consisting of a thin slotted plate, and a liquid-tight casing surrounding the said parts, substantially as and for the purposes hereinbefore set forth.

4. In a disintegrating apparatus, the combination of a revolving disintegrator, a casing surrounding the same having a bottom with a step or vertically-disposed portion $d'$ arranged opposite to the direction of rotation of the disintegrator, and a discharge-pipe communicating with the interior of such casing through an opening in the said part $d'$ of the casing-bottom, substantially as and for the purposes hereinbefore set forth.

In testimony whereof I have hereunto set my hand this 7th day of January, 1898.

JEFFERSON CHASE.

Witnesses:
   JOHN WELLS,
   FRANK D. MARSHALL.